United States Patent [19]

Herding et al.

[11] Patent Number: 5,547,481
[45] Date of Patent: Aug. 20, 1996

[54] FILTER ELEMENT HAVING AN INHERENTLY STABLE, PERMEABLY POROUS PLASTIC BODY

[75] Inventors: Walter Herding, Hanbach; Jürgen Bethke, Sulzbach-Rosenberg; Klaus Rabenstein, Hahnbach-Süss, all of Germany

[73] Assignee: Herding GmbH Entstaubungsanlagen, Amberg, Germany

[21] Appl. No.: 313,134

[22] PCT Filed: Apr. 1, 1993

[86] PCT No.: PCT/EP93/00803

§ 371 Date: Mar. 7, 1995

§ 102(e) Date: Mar. 7, 1995

[87] PCT Pub. No.: WO93/19832

PCT Pub. Date: Oct. 14, 1993

[30] Foreign Application Priority Data

Apr. 6, 1992 [DE] Germany ............ 42 11 529.9

[51] Int. Cl.⁶ ............. B01D 39/16; B01D 46/24
[52] U.S. Cl. .............. 55/523; 55/524; 55/DIG. 5
[58] Field of Search ............ 55/523, 524, 528, 55/DIG. 5

[56] References Cited

U.S. PATENT DOCUMENTS

| | | | |
|---|---|---|---|
| 2,627,938 | 2/1953 | Frohmader et al. | 55/524 |
| 2,663,652 | 12/1953 | Railing | 55/524 X |
| 3,474,600 | 10/1969 | Tobias | 55/524 |
| 3,577,707 | 5/1971 | White | 55/523 X |
| 3,675,391 | 7/1972 | Gallacher | 55/524 X |
| 3,950,152 | 4/1976 | Guon | 55/523 X |
| 4,370,376 | 1/1983 | Gangal et al. | 55/524 |
| 4,923,725 | 5/1990 | Zafiroglu | 55/528 X |
| 5,188,646 | 2/1993 | Nolen, Jr. | 55/528 X |

FOREIGN PATENT DOCUMENTS 3413213  10/1985  Germany ............ 55/523

*Primary Examiner*—Robert Spitzer
*Attorney, Agent, or Firm*—Spencer & Frank

[57] ABSTRACT

A filter element for separating solid particles from a fluid medium. The filter element comprises a permeably porous, substantially inherently stable shaped body made substantially of polyethylene. The polyethylene is made from polyethylene grains combined and heated to form the shaped body. The polyethylene grains comprisean ultrahigh molecular polyethylene component including fine grains and having an average molecular weight of more than $10^6$. The polyethylene component further has, in an initial state before heating, a grain size distribution of at least 95% by weight of fine grains being larger than 63 microns and less than or equal to 250 microns. In addition, the polyethylene grains comprise a further polyethylene component including fine grains in an initial state before heating, and which has an average molecular weight of less than $10^6$. The fine grains of the further polyethylene component are adapted to be combined and heated with the fine grains of the polyethylene component for forming the shaped body. The filter element further includes a fine pored coating of a fine grained material disposed on the afflux surface of the shaped body for filling at least a considerable depth of surface pores present on the afflux surface, the coating having an average grain size less than an average grain size of the shaped body.

22 Claims, 9 Drawing Sheets

FILTER ELEMENT HAVING AN INHERENTLY STABLE, PERMEABLY POROUS PLASTIC BODY

FIELD OF THE INVENTION

The present invention relates to a filter element, in particular for separating solid particles from air.

BACKGROUND OF THE INVENTION

The document EP-B-0 177 521 discloses a filter element whose substantially inherently stable, permeably porous shaped body is made of fine-grained polyethylene with a higher molecular weight, and polyethylene which is fine-grained in the initial state with a lower molecular weight, these polyethylene components being combined into the shaped body by the action of heat, and a surface-pore coating of fine-grained polytetrafluoroethylene being provided. In actually produced filter elements of this kind the higher-molecular polyethylene has a molecular weight of more than $10^6$. Due to the surface-pore coating, the filter element can filter on the principle of surface filtration. Even fine and extremely fine particles of the medium to be filtered are already held on the afflux surface of the filter element and can be cleaned off of this surface very easily, for example by the backflow principle.

These filter elements were hitherto produced using an ultrahigh-molecular polyethylene starting material, in which just under 10% of grains are larger than 250 microns and smaller than or equal to 63 microns. These filter elements are used quite successfully in practice. However the invention achieves a further improvement in known filter elements.

It is an object of the invention to solve the technical problem of developing a permeably porous filter element having a substantially inherently stable shaped body made substantially of polyethylene and bearing a fine-pored coating on its afflux surface, so as to reduce flow resistance and improve the formation of the coating.

SUMMARY OF THE INVENTION

The above is fulfilled by the instant invention, according to a first embodiment of which a filter element has a permeably porous, substantially inherently stable shaped body, wherein:

(a) the shaped body is made substantially of polyethylene;

(b) the shaped body is built up of ultrahigh-molecular, fine-grained polyethylene with an average molecular weight of more than $10^6$ and a further polyethylene component which is fine-grained in the initial state and has an average molecular weight of less than $10^6$;

(c) the grains of ultrahigh-molecular polyethylene and the further polyethylene component are combined into the shaped body by the action of heat;

(d) the shaped body is provided on its afflux surface for the medium to be filtered with a fine-pored coating of a fine-grained material having a smaller average grain size than the shaped body and filling at least a considerable depth of the surface pores thereof on the afflux surface; and (e) the ultrahigh-molecular polyethylene has in the initial state a grain-size distribution with at least 95% by weight of grains in the range of>63 to ≦250 microns.

This first inventive solution and novel sharp definition of the grain-size range of the ultrahigh-molecular polyethylene for the shaped body to be coated means that the uncoated shaped body has a very uniform pore distribution in which particularly very small pores which increase flow resistance are virtually fully absent. The surface pores of the uncoated shaped body also have a very uniform pore-size distribution. The coating therefore also has a very uniform pore-size distribution with a smaller average pore size, based on the same coating material. This results in a virtually uniform filter load and a virtually perfect surface filtration over the total afflux surface of the filter element.

According to a second embodiment, the present invention relates to a filter element, in particular for separating solid particles from air, which has a permeably porous, substantially inherently stable shaped body, together with the above-mentioned features (a) to (d), wherein:

the ultrahigh-molecular polyethylene has in the initial state a grain-size distribution with at least 60% by weight of grains in the range of>125 to≦250 microns.

This second inventive solution to the stated technical problem achieves effects along the lines of the effects described above in connection with the first solution. While clearly more than half of the grains of ultrahigh-molecular polyethylene in the grain-size range of 63 to 250 microns were hitherto in the grain-size range of 63 to 125 microns and the part by weight of grains in the grain-size range of 125 to 250 microns was clearly under 50%, it has surprisingly been found that the second inventive solution results in reduced flow resistance of the shaped body and homogenizing effects in accordance with those described above.

According to a third embodiment, the present invention relates to a filter element, in particular for separating solid particles from air, which has a permeably porous, substantially inherently stable shaped body, together with the above-mentioned features (a) to (d), wherein:

(a) the shaped body is made substantially of polyethylene;

(b) the shaped body is built up of ultrahigh-molecular, fine-grained polyethylene with an average molecular weight of more than $10^6$; and (c) the shaped body is provided on its afflux surface for the medium to be filtered with a fine-pored coating of a fine-grained material having a smaller average grain size than the shaped body and filling at least a considerable depth of the surface pores thereof on the afflux surface, characterized in that (d) the ultrahigh-molecular polyethylene has in the initial state a grain-size distribution with at least 70% by weight of grains in the range of>63 to≦315 microns; and (e) the grains of ultrahigh-molecular polyethylene are combined directly into the shaped body by the action of heat.

The filter element according to the third aspect of the invention is not provided with a further polyethylene component having an average molecular weight of less than $10^6$; the grains of ultrahigh-molecular polyethylene are combined directly into the shaped body by the action of heat. The third inventive solution achieves effects along the lines of the effects described in connection with the first inventive solution, without the virtual elimination of grains with a size under 63 microns and grains with a size of more than 250 microns (see the description of the first inventive solution above) or the relatively high concentration on the grain-size range of 125 to 250 microns (see the description of the second inventive solution above) being as crucial, although these measures, taken alone or jointly, are also preferred as developments of the third inventive solution.

Alternatively, it is possible to use a further polyethylene component with an average molecular weight of less than $10^6$ in the third inventive solution, but in a clearly lower proportion than hitherto provided. One can use a part by weight of the further polyethylene component of under 15%, preferably under 10%, based on the sum of ultrahigh-molecular polyethylene and further polyethylene component.

Reduced flow resistance for the medium to be filtered flowing through the filter element wall means that smaller delivery, for example of the blower or pump, is required for transporting the medium to be filtered through the filter element. In other words, for a given filtering apparatus with a given filtering surface and given delivery, one obtains a higher throughput of the medium to be filtered through the filtering apparatus.

The shaped body can be made solely of the polyethylene components described above. However it is also possible for the shaped body to have further components which do not significantly impair the permanent combination of the components by the action of heat. These additional components, if any, are generally additives in a relatively small percentage amount. An example is carbon black as an antistatic additive.

The inventive filter element is suitable in general for separating particles from liquid or gaseous media to be filtered. Particularly preferred areas of application are the separation of solid particles from air and the separation of solid particles from liquids such as water or oil.

It is pointed out that the stated coating can also cover the total afflux surface of the shaped body, i.e. it need not be limited to part or all of the depth of the surface pores present on the afflux surface of the shaped body. What is primarily important functionally is that at least a considerable depth of the surface pores be filled, preferably the part of the depth beginning at the surface but also a part of the depth recessed from the surface.

In the third inventive solution the proportion of grains in the range of 63 to 315 microns is preferably at least 80% by weight, more preferably at least 90% by weight, and even more preferably at least 95% by weight.

In a preferred development of the first and third solutions at least 60% by weight of grains are in the range of >125 to ≦250 microns, as in the second solution.

In all three solutions it is preferable for at least 70% by weight of grains to be in the range of >125 to ≦250 microns.

In the second and third solutions it is preferable for at least 80% by weight, more preferably at least 90% by weight, and even more preferably at least 95% by weight, of grains to be in the range of >63 to ≦250 microns.

In all three solutions it is preferable for at least 97% by weight of grains to be in the range of >63 to ≦250 microns.

In the first and second solutions the part by weight of the further polyethylene component is preferably 3 to 70%, more preferably 5 to 60%, and even more preferably 20 to 60%, based on the sum of ultrahigh-molecular polyethylene and further polyethylene component.

When the further polyethylene component is present it preferably has an average molecular weight in the range of $10^3$ to $10^6$. According to a first alternative the average molecular weight of the further polyethylene component is preferably in the range of $10^4$ to $10^6$, more preferably in the range of $10^5$ to $10^6$, even more preferably in the range of $2\times10^5$ to $10^6$. The latter is normally termed a high-molecular polyethylene but in the instant description any polyethylene component with an average molecular weight over $5\times10^4$ will be termed high-molecular for the sake of simplicity.

According to a second alternative the average molecular weight of the further polyethylene component is in the range of less than $5\times10^4$, more preferably in the range of $10^3$ to $5\times10^4$ even more preferably in the range of $5\times10^3$ to $5\times10^4$. These ranges are all in the area of low-molecular polyethylene. Low-molecular polyethylene in the stated molecular weight ranges is frequently also referred to as polyethylene wax. It is possible to use a mixture of the two materials described in the above paragraph as the first alternative and second alternative, so that the further polyethylene component is composed of a first subcomponent with a higher average molecular weight and a second subcomponent with a lower average molecular weight. The part by weight of the second subcomponent is preferably 2 to 50%, more preferably 5 to 20% based on the total further polyethylene component.

As far as the grain-size distribution of the high-molecular polyethylene component of the further polyethylene component, if any, is concerned, in the initial state the grain-size distribution is preferably such that at least 95% by weight of grains are under a grain size of 1000 microns and at most 15% by weight of grains are under a grain size of 63 microns, preferably at least 99% by weight of grains are under a grain size of 1000 microns and at most 5% by weight of grains are under a grain size of 63 microns.

As far as the grain-size distribution of the low-molecular polyethylene component of the further polyethylene component, if any, is concerned, the grain-size distribution in the initial state is preferably such that at least 95% by weight of grains are under a grain size of 500 microns and at most 15% by weight of grains are under a grain size of 63 microns. Alternatively, a so-called microwax is preferred in which at least 95% by weight of grains are under a grain size of 63 microns in the initial state.

When the expression "in the initial state" is used in the present description, it refers to the state of the polyethylene components before the action of heat for combining them into the permeably porous shaped body.

If the further polyethylene component has an average molecular weight of less than $5\times10^4$ or contains a subcomponent with this molecular weight, one observes a particularly high adhesive power of the coating material grains in the surface pores of the shaped body. Pictures of the afflux surface of the filter element taken by scanning electron microscope before application of the coating show that the cause of this effect is presumably that the low-molecular polyethylene component forms curved-stem projections on the walls of the surface pores which evidently promote a particularly firm anchoring of the coating material grains.

The ultrahigh-molecular polyethylene preferably has a grain-size distribution in the initial state such that a graph of "cumulative percentage of pores over pore diameter" with a substantially linear course at least in the range of 20 to 75% results for the uncoated shaped body. More details on the above are found below in the example section of the description.

According to a preferred development of the invention one uses grains of ultrahigh-molecular polyethylene that have a shape with bump-like raised areas above the otherwise substantially spherical grain shape. It has been found that the above configuration results in particularly good adhesion of the coating material grains to the shaped body or in its surface pores. One has also observed a tendency toward reduced flow resistance of the shaped body.

With respect to the average molecular weight of the ultrahigh-molecular polyethylene an upper limit of $6\times10^6$ is preferred; a range of $2 \times 10^6$ to $6 \times 10^6$ is particularly preferred.

The grains of ultrahigh-molecular polyethylene preferably have a bulk density of 300 to 550 g/l, whereby 350 to 500 g/l is particularly preferred. The bulk density of the high-molecular polyethylene component in the initial state is preferably 200 to 350 g/l. The melting temperature of the low-molecular polyethylene component is preferably 100° C. to 150° C.

The fine-grained material for coating the surface pores is preferably polytetrafluoroethylene. The fine-grained coating material preferably has an average grain size of under 100 microns, most preferably under 50 microns.

Another object of the invention is to provide a method for producing the filter elements or shaped bodies described above, including the steps of:

pouring the grains of ultrahigh-molecular polyethylene, optionally mixed with the further polyethylene component, into a mold;

heating the content of the mold to a temperature of 170° C. to 250° C. for a sufficient time to combine the grains into the shaped body (generally 10 to 180 min);

cooling the shaped body in the mold (not necessarily down to room temperature);

removing the shaped body from the mold; and applying the coating to the afflux surface of the shaped body removed from the mold.

The coating can be applied particularly favorably in the form of a suspension which is then dried, preferably by blowing hot air thereon. The suspension can be applied particularly well by the spray and brush method.

The content of the mold is preferably shaken into the mold by vibration. When the content of the mold is heated the low-molecular polyethylene component, if present, melts first. As the temperature of the mold content increases further the high-molecular polyethylene component also starts to melt, and the ultrahigh-molecular polyethylene grains can soften somewhat on their surface in an inherently stable fashion. The high-molecular polyethylene component forms a binding skeleton between the ultrahigh-molecular polyethylene grains, while the low-molecular polyethylene component, if present, is deposited on the high-molecular binding skeleton and the ultrahigh-molecular polyethylene grains. If the further polyethylene component is not present the ultrahigh-molecular polyethylene grains bond together when the content of the mold is heated due to the inherently stable softening on their surface.

The polyethylene components described above are commercially available, for example from Hoechst AG and BASF AG, apart from the grain-size distribution according to the first inventive solution and the grain-size distribution according to the second inventive solution.

It is explicitly pointed out that filter elements with one or more of the features stated above are technically useful and inventive even without the features of the first, second or third inventive solutions.

The invention shall be explained in more detail in the following with reference to examples.

DETAILED DESCRIPTION OF THE INVENTION

Figure 1:
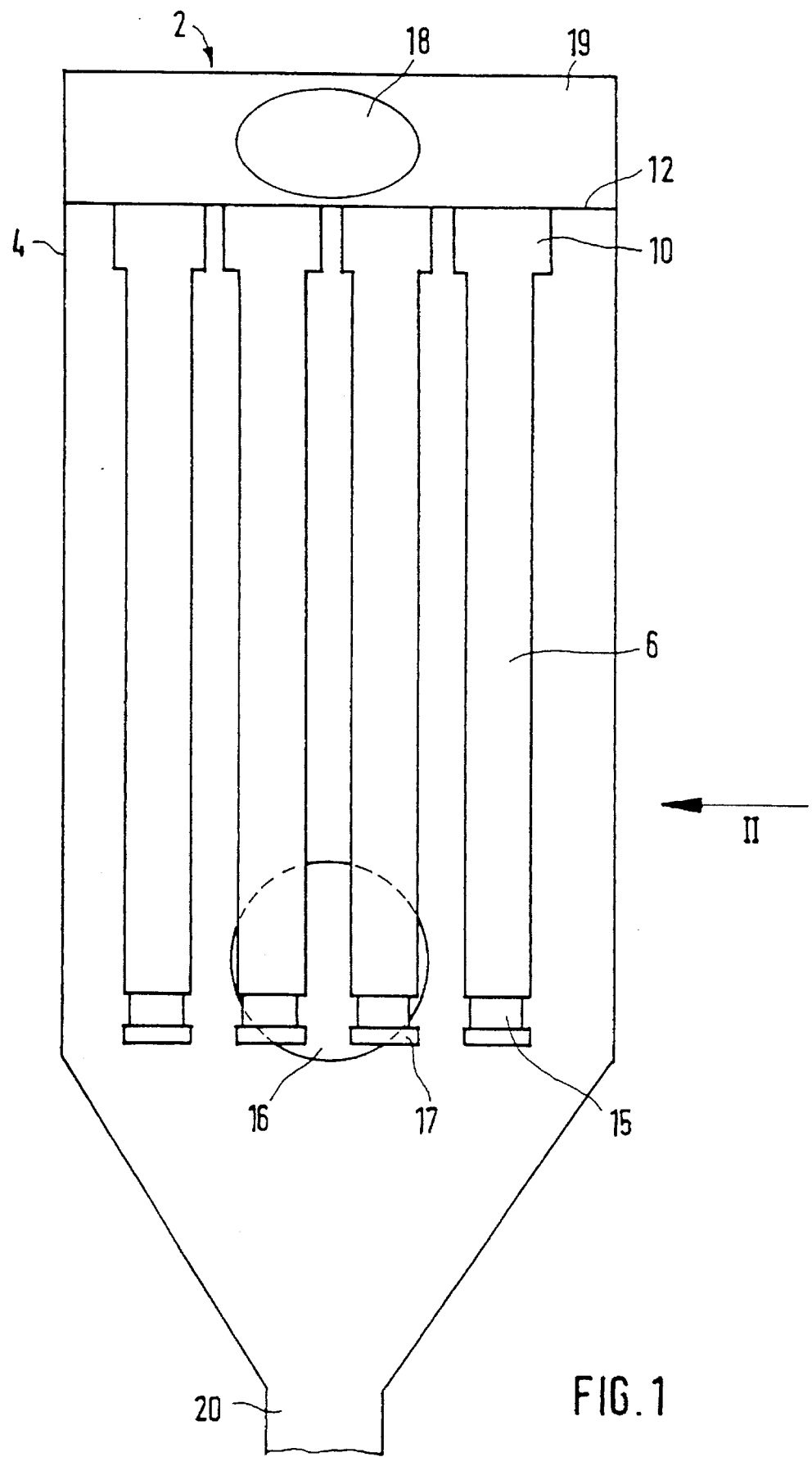
FIG. 1 shows a cross sectional view of a filtering apparatus in accordance with the invention.
Figure 2:
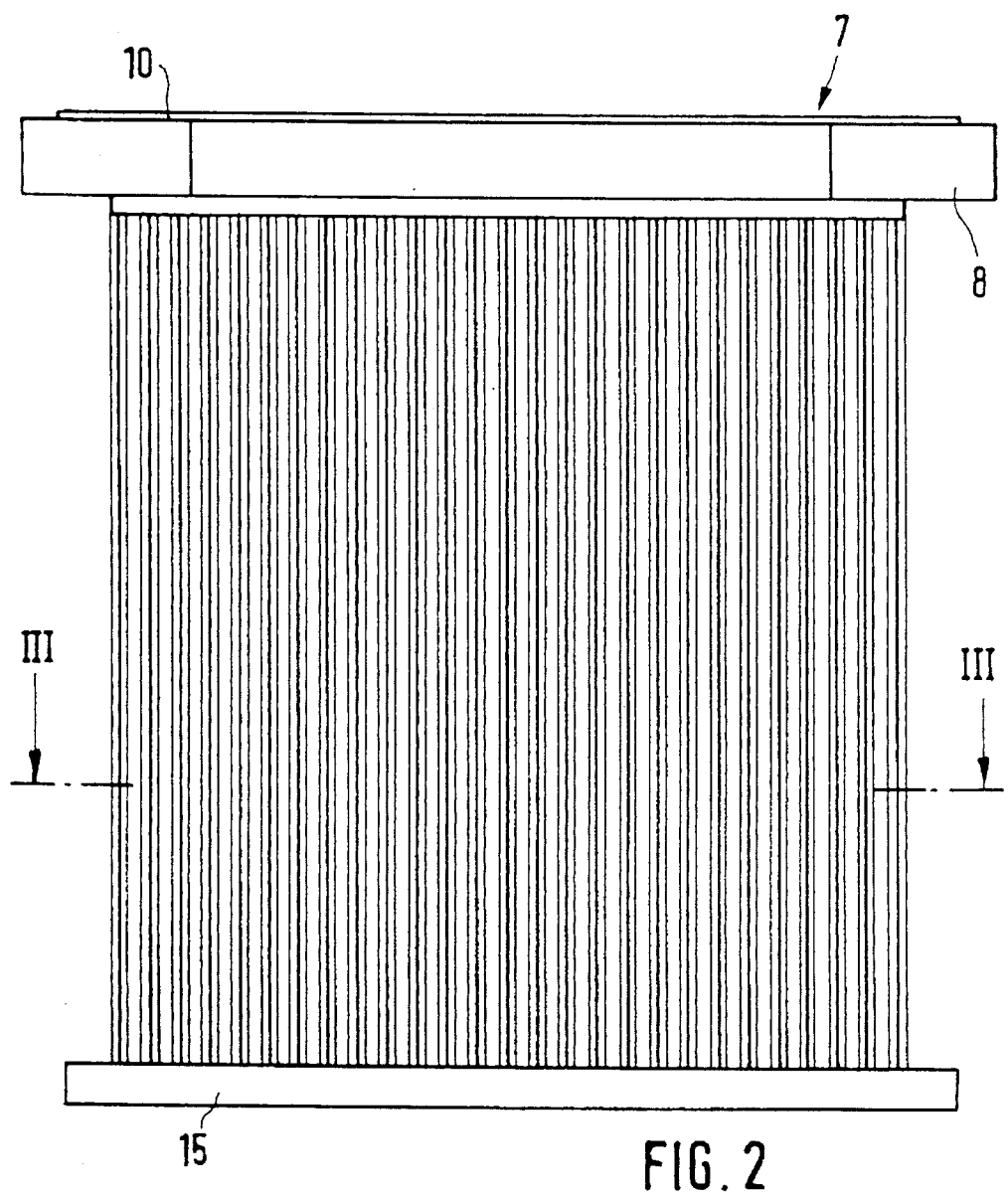
FIG. 2 shows a side elevational view of a single filter element of the filtering apparatus of FIG. 1 in the direction of arrow II in FIG. 1.
Figure 3:
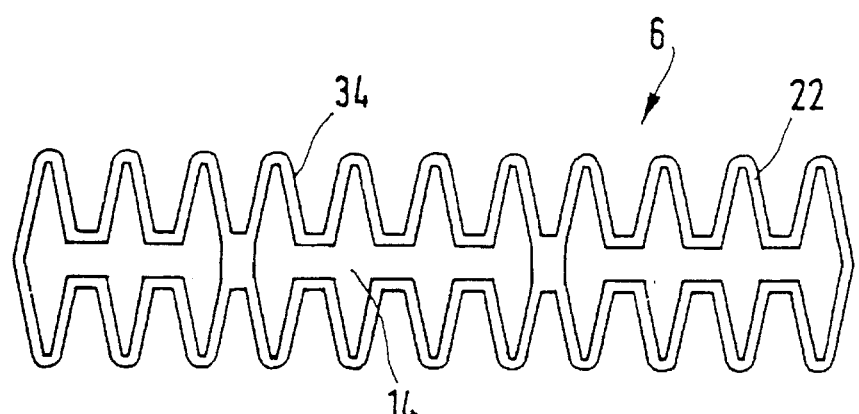
FIG. 3 shows a horizontal cross sectional of a filter element having a smaller number of wall profilings than in FIG. 2.

Filtering apparatus 2 illustrated in FIG. 1, often referred to for short as a "filter," comprises housing 4 in which four filter elements 6 are spaced apart parallel to one other in the embodiment example shown. Filter elements 6 have—roughly speaking—the shape of a narrow right parallelepiped at their outlines, and include bellows like walls extending in zigzag fashion on the long sides (see FIG. 3). Such filter elements 6 are also referred to as lamellar filter elements. Pocket-shaped filter elements 6 are hollow, are open on the top and the underside, and have a substantially constant wall thickness all around. It is pointed out that the filter elements can also have a different shape, for example a tubular shape.

Each filter element 6 comprises outwardly coated shaped body 22 whose material composition will be described more exactly below. Each body 22 is provided in the upper head area with edge area 10 protruding all around, and provided there with a fastening and stiffening plate so that it can be fastened more easily in housing 4 of filtering apparatus 2. The four filter elements 6 are fastened from below to strong perforated plate 12 disposed transversely in housing 4, with interior space 14 of each filter element communicating with the space above perforated plate 12 via a plurality of holes. In the lower foot area of each filter element 6 skirting 15 is fastened to shaped body 22, sealing body 22 from below and rising above it at both ends. Skirting 15 rests with each end on projections 17 of housing 4. Body 22 shown is divided into three cavities following one another in the longitudinal direction of skirting 15.

The medium to be filtered flows inside housing 4 through afflux port 16, then from the outside to the inside of filter elements 6, from there into space 19 above perforated plate 12, and leaves filtering apparatus 2 through exit port 18. Below filter elements 6 housing 4 is funnel-shaped so that particles separated from the medium to be filtered and dropping off filter elements 6 due to cleaning can be removed from time to time through particle discharge port 20.

Shaped body 22 of each filter element 6 may be made of ultrahigh-molecular polyethylene grains and a further polyethylene component. These components were fine-grained when poured into the production mold but only the ultrahigh-molecular polyethylene in granular form exists in finished body 22. The stated components are combined by the action of heat into the substantially inherently stable, permeably porous shaped body by the production method described above.

Figure 4:
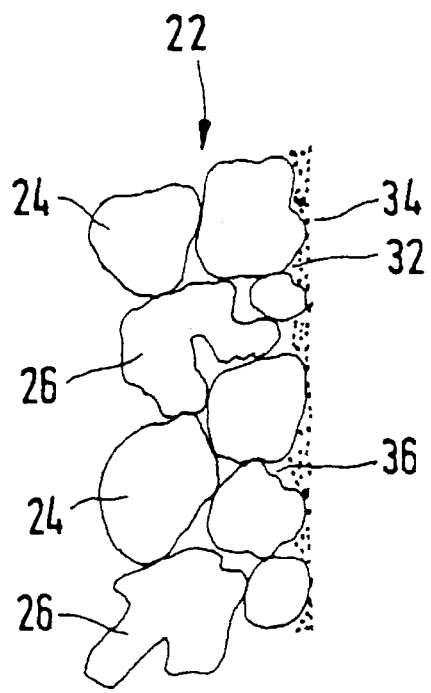
FIG. 4 shows a greatly enlarged cross sectional view of a portion of the outer surface of the filter element of FIGS. 2 and 3.
Figure 5:
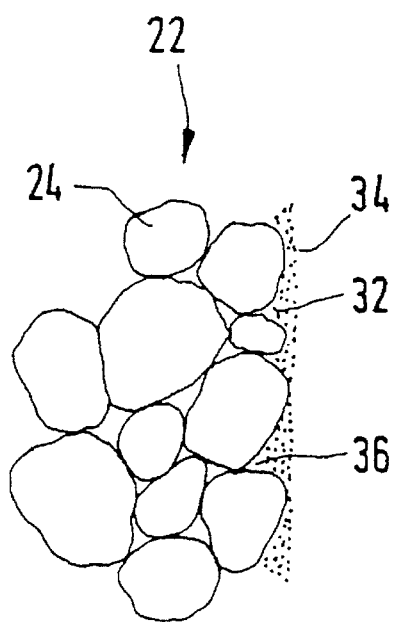
FIG. 5 is a view similar to FIG. 4 showing a portion of the outer surface of an alternative filter element.

FIG. 4 shows schematically the structure of finished shaped body 22 including fine-pored surface-pore coating 32. High-molecular polyethylene component 26 forms a binding skeleton between the grains of ultrahigh-molecular polyethylene under the action of heat during production. The low-molecular components are additionally deposited on the high-molecular and the ultrahigh-molecular polyethylene material. Ultrahigh-molecular polyethylene grains 24 have virtually not changed their shape during production. Altogether the structure of shaped body 22 is highly porous. If no high-molecular and no low-molecular polyethylene component are used the resulting shaped body structure is as in FIG. 5. Ultrahigh-molecular grains 24 are sintered together at their points of contact.

Coating 32 comprises small polytetrafluoroethylene grains. Coating 32 fills at least part of the depth of pores 36 present on outer surface 34 (i.e. the afflux surface for the medium to be filtered) of shaped body 22.

Figure 6:
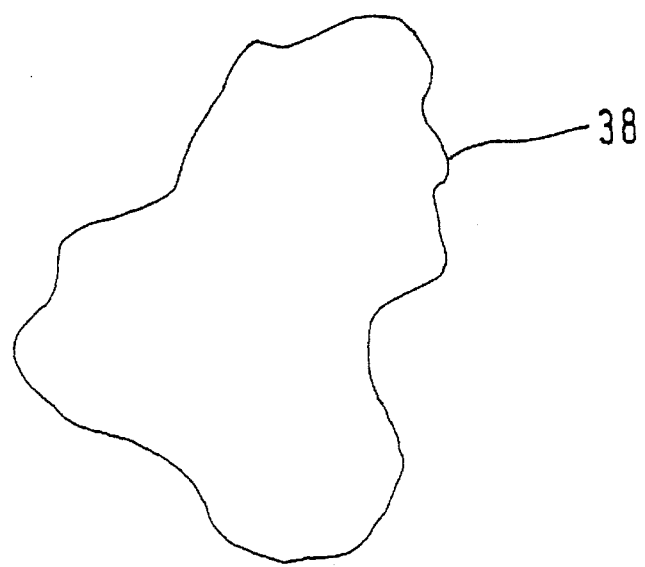
FIG. 6 shows an ultrahigh-molecular polyethylene grain with a special grain shape.

FIG. 6 shows the grain shape of preferred ultrahigh-molecular polyethylene component 24. This grain shape can be described—roughly speaking—as substantially spherical with bump-like or wart-like raised areas 38. The advantageous effects of using ultrahigh-molecular polyethylene with this grain shape have been described above.

EXAMPLES

Three examples of inventive shaped bodies will be described more precisely with respect to their material structure and the grain-size distribution of the ultrahigh-molecular polyethylene grains, and compared with a standard example according to the prior art.

Example 1:

A shaped body is produced by the described method from about 60% by weight of ultrahigh-molecular polyethylene with an average molecular weight of $2 \times 10^6$ and about 40% by weight of fine-grained high-molecular polyethylene with an average molecular weight of about $3 \times 10^5$. The grain-size distribution of the ultrahigh-molecular component in the initial state is:

| under 63 microns: | 1% |
| 63 to 125 microns: | 59% |
| 125 to 250 microns: | 40% |
| over 250 microns: | 0% |

Figure 7:
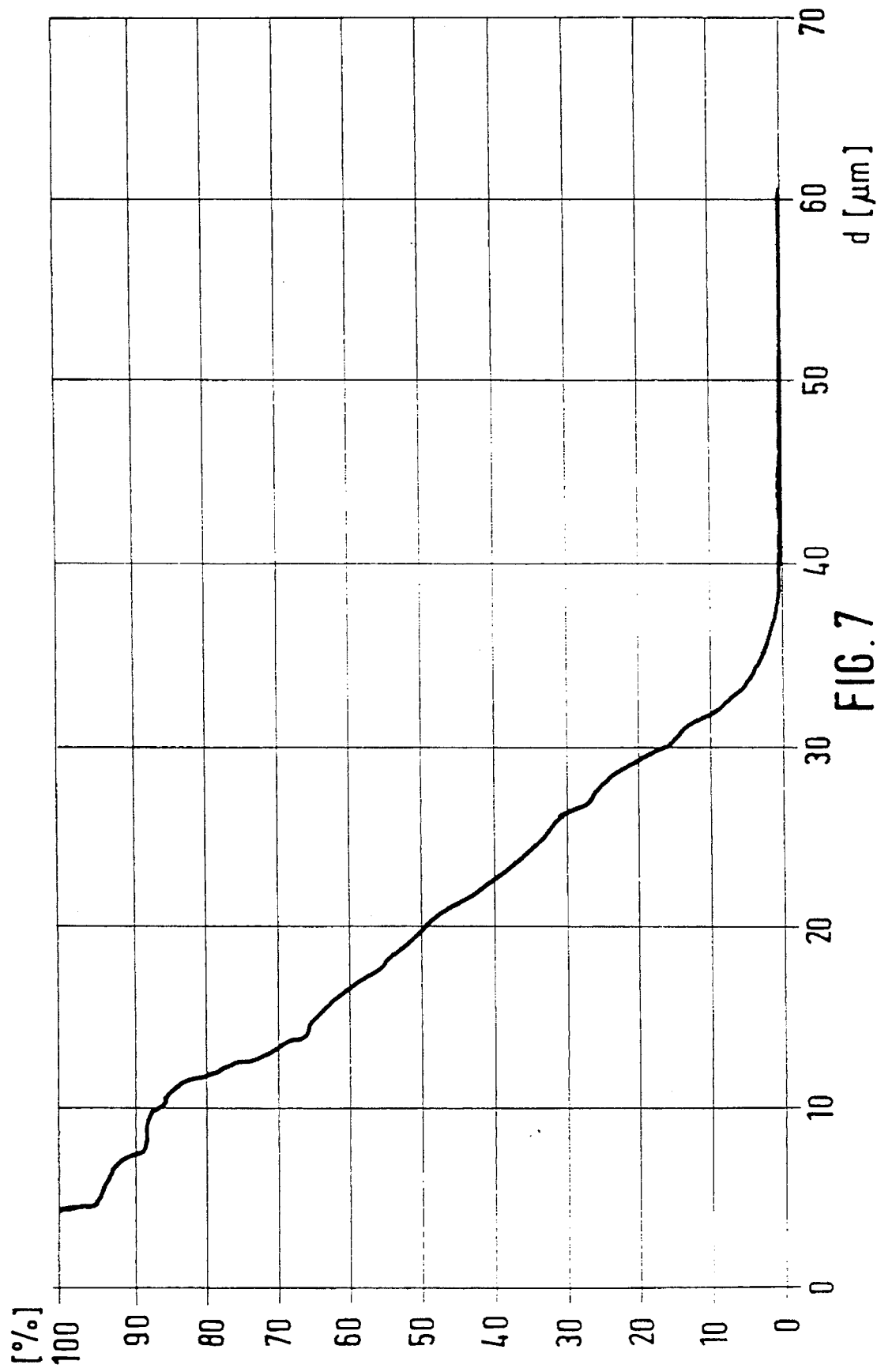
FIGS. 7, 9, 10, 11 show graphs of "cumulative percentage of pores over pore diameter" for several uncoated shaped bodies.

A graph of "cumulative percentage of pores over pore diameter" as in FIG. 7 is determined on the shaped body. Pore diameter $d_{50}$, i.e. that pore diameter of the body in which 50% of pores are larger than $d_{50}$ and 50% smaller than $d_{50}$, is about 20 microns. The graph of FIG. 7 is substantially linear in the range of about 10 to 83%. There are virtually no pores sized over 40 microns.

Figure 8:
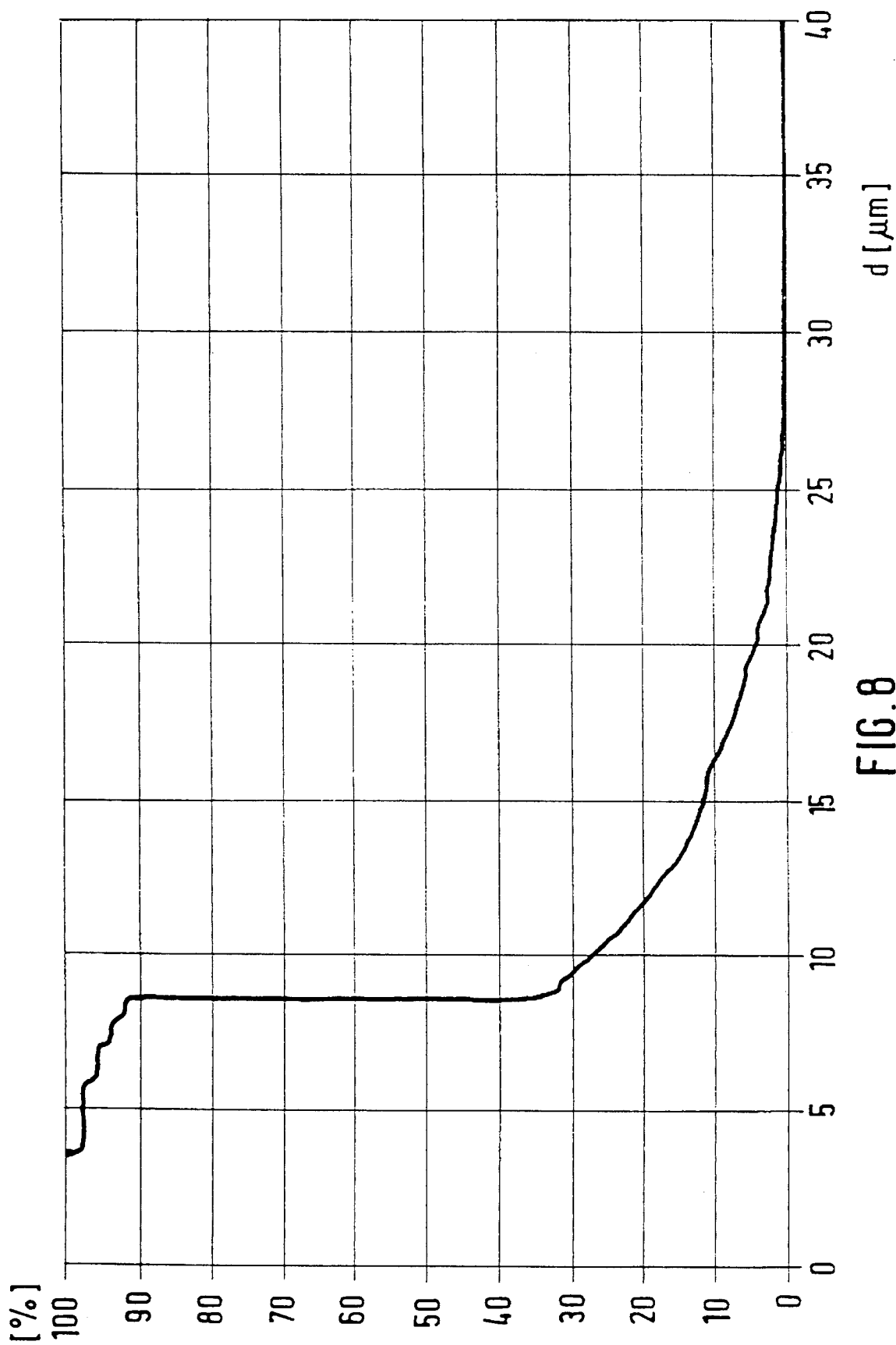
FIGS. 8, 12 show graphs similar to FIGS. 7, 9, 10, 11 but for coated shaped bodies or for the coating.

After applying a coating of small polytetrafluoroethylene grains one determines the graph of pore-size distribution as in FIG. 8, like the graph of FIG. 7. Now $d_{50}$ is about 8.5 microns. Only about 36% of pores are larger than $d_{50}$ and only about 10% of pores are smaller than $d_{50}$. Pores with a size above 30 microns are virtually absent.

After 200 working hours in a filtering apparatus according to FIG. 1 one measures a pressure loss of 225 millimeters head of water on the filter element.

Example 1 is within the definitions of the first inventive solution.

Example 2:

A shaped body is produced by the described method from about 54% by weight of ultrahigh-molecular polyethylene with an average molecular weight of about $4 \times 10^6$, about 35% by weight of fine-grained high-molecular polyethylene with an average molecular weight of $3 \times 10^5$ and about 11% by weight of fine-grained low-molecular polyethylene with an average molecular weight of about $2 \times 10^4$. The grain-size distribution of the ultrahigh-molecular component in the initial state is:

| under 63 microns: | 1.5% |
| 63 to 125 microns: | 23% |
| 125 to 250 microns: | 73% |
| 250 to 315 microns: | 3% |
| over 400 microns: | 0% |

Figure 9:
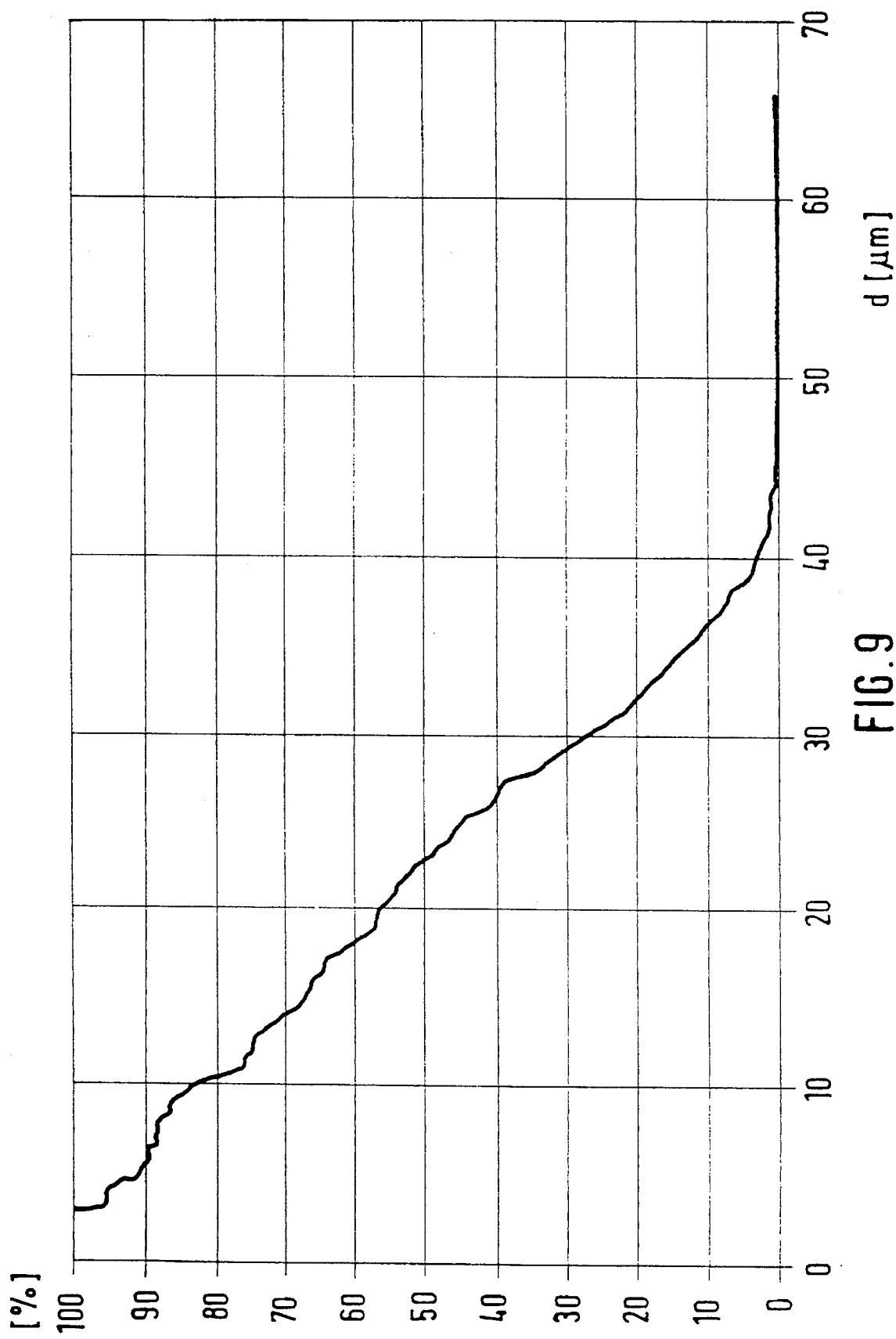

A graph of "cumulative percentage of pores over pore diameter" as in FIG. 9 is determined on the shaped body. Pore diameter $d_{50}$ is about 23 microns. The graph of FIG. 9 is substantially linear in the range of about 8 to 75%. There are virtually no pores sized over 45 microns.

After 200 working hours in a filtering apparatus according to FIG. 1 one measures a pressure loss of 240 millimeters head of water on the filter element coated with small polytetrafluoroethylene grains.

Example 2 is within the definitions of both the first and the second inventive concepts.

Example 3:

A shaped body is produced by the described method from 100% by weight of ultrahigh-molecular polyethylene with an average molecular weight of about $4 \times 10^6$. The grain-size distribution of the starting material is:

| under 63 microns: | 1.5% |
| 63 to 125 microns: | 23% |
| 125 to 250 microns: | 73% |
| 250 to 315 microns: | 3% |
| over 400 microns: | 0% |

Figure 10:
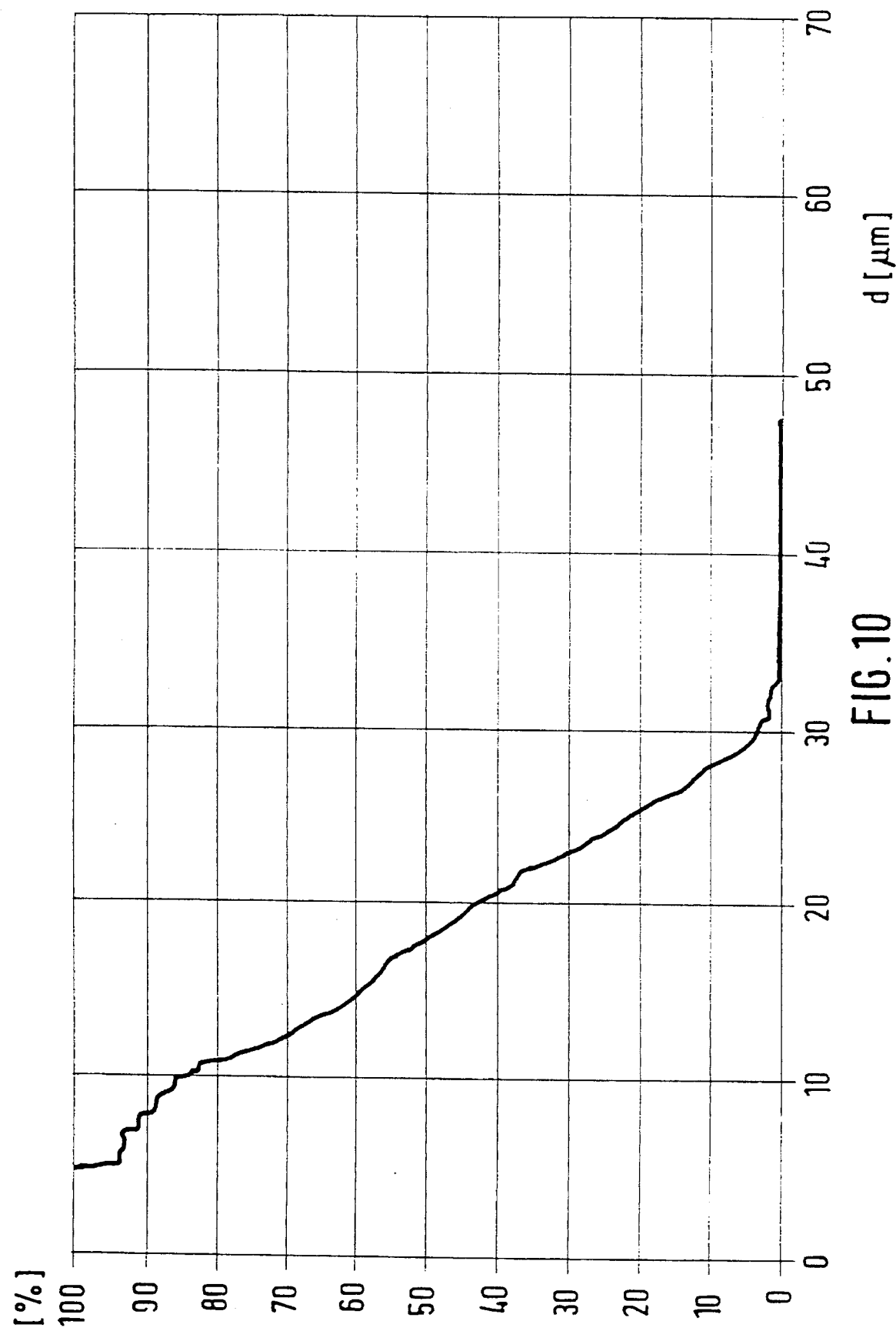

A graph of "cumulative percentage of pores over pore diameter" as in FIG. 10 is determined on the shaped body. Pore diameter $d_{50}$ is about 17.5 microns. The graph of FIG. 10 is substantially linear in the range of about 4 to 81%. There are virtually no pores sized over 35 microns.

After 200 working hours in a filtering apparatus according to FIG. 1 one measures a pressure loss of 205 millimeters head of water on the filter element coated with small polytetrafluoroethylene grains.

Example 3 is within the definitions of the first, the second and the third inventive concepts.

Comparative example:

A shaped body is produced by the described method from about 60% by weight of ultrahigh-molecular polyethylene with an average molecular weight of about $2 \times 10^6$ and about 40% by weight of fine-grained high-molecular polyethylene with an average molecular weight of about $3 \times 10^5$. The grain-size distribution of the ultrahigh-molecular component in the initial state is:

| under 63 microns: | 4% |
| 63 to 125 microns: | 48% |
| 125 to 250 microns: | 45% |
| over 250 microns: | 3% |

Figure 11:
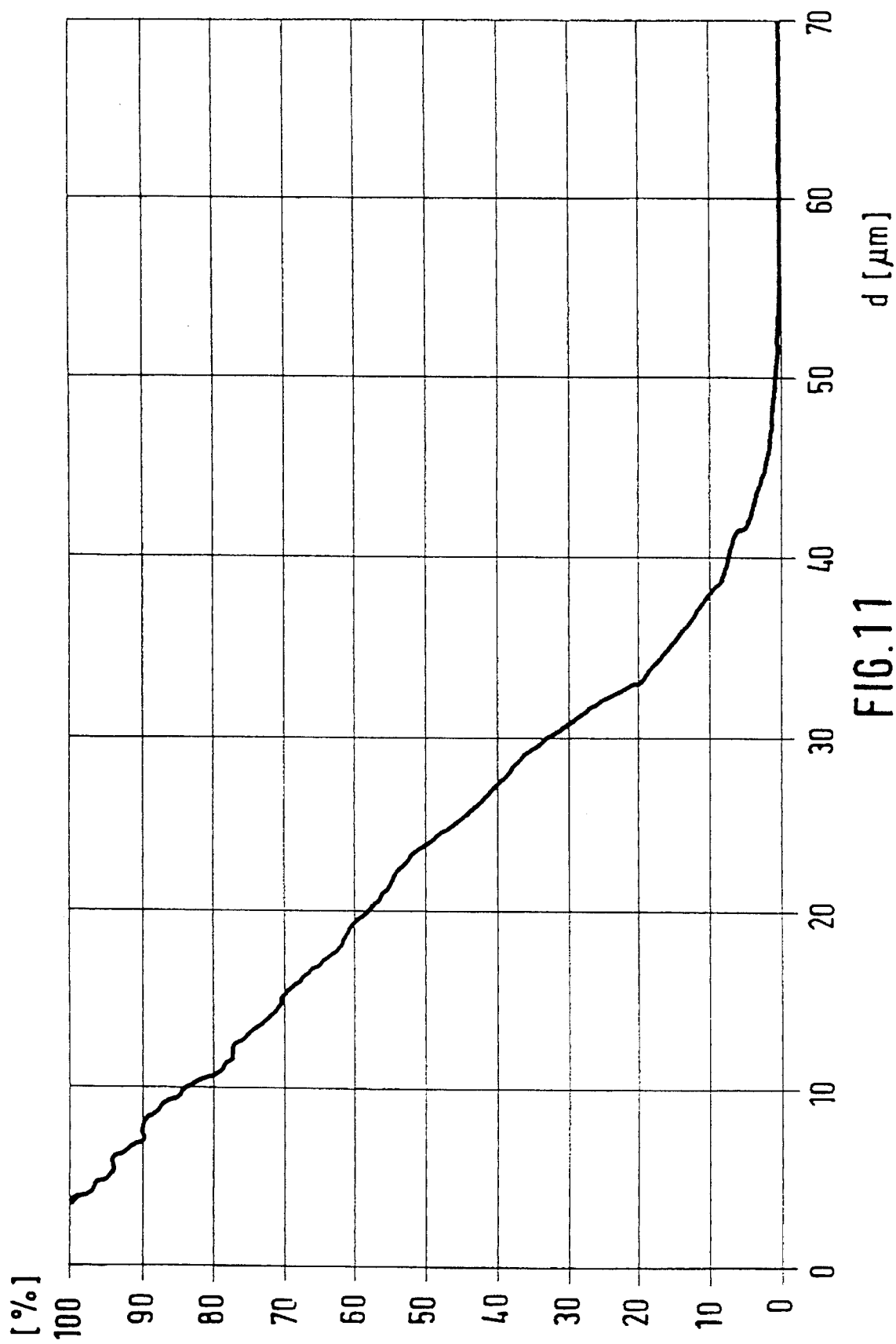

A graph of "cumulative percentage of pores over pore diameter" as in FIG. 11 is determined on the shaped body. Pore diameter $d_{50}$ is about 24 microns. There are virtually no pores sized over 55 microns.

Figure 12:
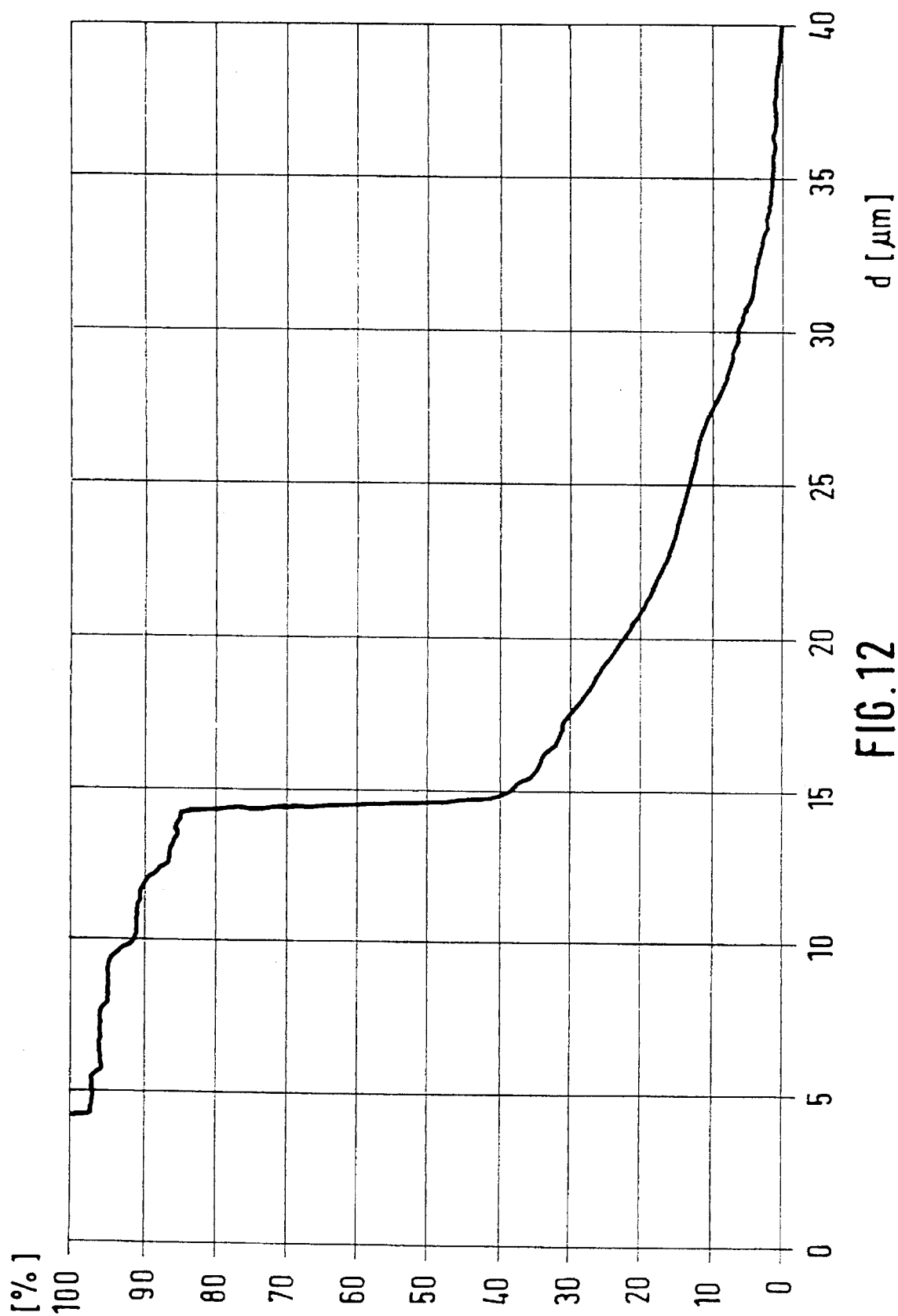

After applying a coating of small polytetrafluoroethylene grains one determines the graph of pore-size distribution according to FIG. 12, like the graph of FIG. 11. Now $d_{50}$ is about 14.5 microns. About 40% of pores are larger than $d_{50}$ and about 15% of pores are smaller than $d_{50}$.

After 200 working hours in a filtering apparatus according to FIG. 1 one measures a pressure loss of 270 millimeters head of water on the filter element.

The shaped body in the comparative example is outside the definitions of the first, second and third inventive solutions.

In all four examples the coating was of course applied from the same starting material and the pressure loss measured in the same filtering apparatus subjected to air with the same content of solid particles.

In case of a coating of polytetrafluoroethylene particles it is generally preferred to apply the coating in the form of a suspension which in addition contains an adhesive. Particularly suitable are adhesives known as disperse adhesives, in particular adhesive dispersions on the basis of polyvinylacetate, such as MOWILITH (registered trademark of Hoechst AG) being an aqueous copolymer dispersion of vinylacetate, ethylene and vinylchloride. Typically, the suspension to be applied to the afflux surface of the filter element for forming the coating has the following composition:

20 weight % polytetrafluoroethylene particles
6 weight % MOWILITH
74 weight % water.

We claim:

1. A filter element for separating solid particles from a fluid medium, the filter element comprising:

a permeably porous, substantially inherently stable shaped body made substantially of polyethylene and having an afflux surface defining surface pores thereon, the polyethylene being made from polyethylene grains combined and heated to form the shaped body, the polyethylene grains comprising:

an ultrahigh molecular polyethylene component including fine grains and having an average molecular weight of more than $10^6$, the polyethylene component further having, in an initial state before heating, a minimum percentage of 95% by weight of fine grains larger than 63 microns and less than or equal to 250 microns; and a further polyethylene component including fine grains in an initial state before heating, and which has an average molecular weight of less than $10^6$, the fine grains of the further polyethylene component being adapted to be combined and heated with the fine grains of the polyethylene component for forming the shaped body; and a fine pored coating of a fine grained material disposed on the afflux surface of the shaped body for filling at least a considerable depth of the surface pores present on the afflux surface, the coating having an average grain size less than an average grain size of the shaped body.

2. The filter element according to claim 1, wherein the polyethylene component has in an initial state before heating a minimum percentage of one of 60% and 70% by weight of fine grains larger than 125 microns and less than or equal to 250 microns.

3. The filter element according to claim 1, wherein the polyethylene component has in an initial state before heating a minimum percentage of 97% by weight of fine grains larger than 63 microns and less than or equal to 250 microns.

4. The filter element according to claim 1, wherein the further polyethylene component is one of 3% to 70%, 5% to and 20% to 60% by weight of the shaped body.

5. The filter element according to claim 1, wherein the further polyethylene component has an average molecular weight between $10^3$ and $10^6$.

6. The filter element according to claim 1, wherein the further polyethylene component comprises:

a first subcomponent having an average molecular weight between one of $10^4$ and $10^6$, and $10^5$ to $10^6$; and a second subcomponent having an average molecular weight of less than $5\times10^4$, the second subcomponent being adapted to be combined with the first subcomponent for composing the further polyethylene component.

7. The filter element according to claim 6, wherein the second subcomponent has an average molecular weight between one of $10^3$ to $5\times10^4$ and $5\times10^3$ to $5\times10^4$.

8. The filter element according to claim 6, wherein the second subcomponent is one of 2% to 50% and 5% to 20% by weight of a total amount of the further polyethylene component.

9. The filter element according to claim 1, wherein the ultrahigh molecular polyethylene component has, in the initial state, a grain size distribution such that the shaped body presents a graph of cumulative percentage of pores over pore diameter with a substantially linear course between 20% and 75% of pore percentages.

10. The filter element according to claim 1, wherein the fine grains of the ultrahigh molecular polyethylene component have a substantially spherical shape having bump-like raised areas thereon.

11. The filter element according to claim 1, wherein the ultrahigh molecular polyethylene component has an average molecular weight of less than $6\times10^6$.

12. The filter element according to claim 11 wherein the ultrahigh molecular polyethylene has an average molecular weight between $2\times10^6$ and $6\times10^6$.

13. The filter element according to claim 1, wherein the coating is made of polytetrafluoroethylene.

14. The filter element according to claim 1, wherein the coating is made of a material having an average grain size of under one of 100 microns and 50 microns.

15. A method of producing the filter element of claim 1, comprising the steps of:

pouring the fine grains of the ultrahigh molecular polyethylene component and the further polyethylene component into a mold;

heating a content of the mold to a temperature of 170° C. to 250° C. for a sufficient time to combine the grains into the shaped body;

cooling the shaped body in the mold;

removing the shaped body from the mold; and applying the coating to the afflux surface of the shaped body after the step of removing.

16. A filter element for separating solid particles from a fluid medium, the filter element comprising:

a permeably porous, substantially inherently stable shaped body made substantially of polyethylene and having an afflux surface defining surface pores thereon, the polyethylene being made from polyethylene grains combined and heated to form the shaped body, the polyethylene grains comprising:

an ultrahigh molecular polyethylene component including fine grains and having an average molecular weight of more than $10^6$, the polyethylene component further having, in an initial state before heating, a minimum percentage of 60% by weight of fine grains larger than 125 microns and less than or equal to 250 microns; and a further polyethylene component including fine grains in an initial state before heating, and which has an average molecular weight of less than $10^6$, the fine grains of the further polyethylene component being adapted to be combined and heated with the fine grains of the polyethylene component for forming the shaped body; and a fine pored coating of a fine grained material disposed on the afflux surface of the shaped body for filling at least a considerable depth of the surface pores present on the afflux surface, the coating having an average grain size less than an average grain size of the shaped body.

17. The filter element according to claim 16, wherein the polyethylene component has in an initial state before heating a minimum percentage of one of 80%, 90% and 95% by weight of fine grains larger than 63 microns and less than or equal to 250 microns.

18. A filter element for separating solid particles from a fluid medium, the filter element comprising:

a permeably porous, substantially inherently stable shaped body made substantially of polyethylene and having an afflux surface defining surface pores thereon, the polyethylene being made from an ultrahigh molecular polyethylene component including fine grains and having an average molecular weight of more than $10^6$, the polyethylene component further having, in an initial state before heating, a minimum percentage of 70% by weight of fine grains larger than 63 microns and less than or equal to 315 microns, the fine grains being adapted to be heated for forming the shaped body; and a fine pored coating of a fine grained material disposed on the afflux surface of the shaped body for filling at least a considerable depth of the surface pores present on the afflux surface, the coating having an average grain size less than an average grain size of the shaped body.

19. The filter element according to claim 18, wherein a minimum percentage by weight of fine grains larger than 63 microns and less than or equal to 315 microns is one of 80%, 90% and 95%.

20. A method of producing the filter element of claim 18, comprising the steps of:

pouring the fine grains of the ultrahigh molecular polyethylene component into a mold;

heating a content of the mold to a temperature of 170° C. to 250° C. for a sufficient time to combine the grains into the shaped body;

cooling the shaped body in the mold;

removing the shaped body from the mold; and applying the coating to the afflux surface of the shaped body after the step of removing.

21. The method according to claim 20, wherein the step of applying the coating includes the steps of:

applying a suspension to the afflux surface of the shaped body; and drying the suspension.

22. The method according to claim 21, wherein the step of applying a suspension includes the steps of spraying and brushing the suspension on the afflux surface of the shaped body.

* * * * *